(12) United States Patent
Chen et al.

(10) Patent No.: US 11,056,968 B2
(45) Date of Patent: Jul. 6, 2021

(54) POWER CONVERTER, POWER CONTROLLER, AND CONTROL METHOD CAPABLE OF PROVIDING MULTIPLE PROTECTIONS

(71) Applicant: Weltrend Semiconductor Inc., Hsinchu (TW)

(72) Inventors: Chun-Teh Chen, Hsinchu (TW); Yi Lun Shen, Hsinchu (TW); Yu-Yun Huang, Hsinchu (TW); Ren Yi Chen, Hsinchu (TW)

(73) Assignee: WELTREND SEMICONDUCTOR INC., Hsinchu (TW)

( * ) Notice: Subject to any disclaimer, the term of this patent is extended or adjusted under 35 U.S.C. 154(b) by 316 days.

(21) Appl. No.: 16/144,411

(22) Filed: Sep. 27, 2018

(65) Prior Publication Data
US 2019/0103807 A1 Apr. 4, 2019

(30) Foreign Application Priority Data
Oct. 3, 2017 (TW) .................................. 106134107

(51) Int. Cl.
*H02M 1/36* (2007.01)
*H02M 1/32* (2007.01)
*H02M 3/335* (2006.01)
*H02H 7/12* (2006.01)

(52) U.S. Cl.
CPC ............ *H02M 1/32* (2013.01); *H02H 7/1213* (2013.01); *H02M 3/33507* (2013.01); *H02M 3/33523* (2013.01); *H02M 2001/327* (2013.01)

(58) Field of Classification Search
CPC . H02M 1/32; H02M 2001/327; H02H 7/1213
See application file for complete search history.

(56) References Cited

U.S. PATENT DOCUMENTS

| 2013/0121044 | A1* | 5/2013 | Gao | H02M 1/32 363/50 |
| 2013/0301302 | A1* | 11/2013 | Wu | H02M 3/325 363/15 |
| 2014/0016378 | A1* | 1/2014 | Ke | H02M 3/33507 363/21.18 |
| 2014/0071714 | A1* | 3/2014 | Li | H02M 3/33507 363/16 |

(Continued)

*Primary Examiner* — Alex Torres-Rivera
(74) *Attorney, Agent, or Firm* — McClure, Qualey & Rodack, LLP

(57) ABSTRACT

A power converter capable of performing over-voltage protection and over-temperature protection converts an input voltage into an output voltage. A power switch is connected in series with a primary winding between the input voltage and an input ground. A power controller with a multi-function pin controls the power switch to control a winding current through the primary winding. The power converter has a multi-purpose circuit with first and second resistors, a rectifier and a thermistor. A connection node makes the first and second resistors connected in series between two ends of an auxiliary winding. The rectifier and the thermistor are connected in parallel between the multi-function pin and the connection node. The power controller can perform over-voltage protection and over-temperature protection via the multi-purpose circuit and the multi-function pin.

17 Claims, 6 Drawing Sheets

(56) References Cited

U.S. PATENT DOCUMENTS

| | | | |
|---|---|---|---|
| 2015/0207311 A1* | 7/2015 | Chang | H02H 5/042 |
| | | | 361/91.1 |
| 2015/0295496 A1* | 10/2015 | Chen | H02M 1/32 |
| | | | 363/21.18 |
| 2015/0326129 A1* | 11/2015 | Lin | H02M 3/33507 |
| | | | 363/21.12 |
| 2016/0190936 A1* | 6/2016 | Ke | H02M 3/33507 |
| | | | 363/21.12 |
| 2016/0226239 A1* | 8/2016 | Yang | H02M 1/32 |
| 2016/0365796 A1* | 12/2016 | Lee | H02M 3/33515 |

* cited by examiner

POWER CONVERTER, POWER CONTROLLER, AND CONTROL METHOD CAPABLE OF PROVIDING MULTIPLE PROTECTIONS

CROSS-REFERENCE TO RELATED APPLICATION

This application claims priority to and the benefit of Taiwan Application Series Number 106134107 filed on Oct. 3, 2017, which is incorporated by reference in its entirety.

BACKGROUND

The present disclosure relates generally to switching mode power converters, more particularly to those capable of providing protections under abnormal operation conditions.

Household appliances often need power converters to convert, for example, the alternating-current (AC) voltage from mains electricity into power sources that the core circuits in the household appliances require. Each cell phone, for instance, is sold with a USB charger as a power converter that charges the battery in that cell phone.

The environments where a power convert stays might be unpredictable and could cause dangerous consequences if the power converter does not equip with certain protections, which, as well known in the art, include over-voltage protection (OVP), brownout protection, over-temperature protection (OTP), and output short protection, to name a few. If an abnormal condition happens, a corresponding protection should trigger to shut down power conversion so as to protect devices or human beings from being hurt.

OVP refers to the mechanism of limiting the output voltage of a power converter under a specific value. Over voltage happens easily if the feedback loop inside a power converter fails, and it could hazard a load or a person that touches the output of the power converter.

A brownout is an intentional or unintentional drop in voltage in an electrical power supply system. As the input voltage of a power converter falls, the current draw will increase to maintain the same output voltage and current, until such a point that the power supply malfunctions. Brownout protection shuts down a power converter when the brownout is sensed.

A power converter forwards most of the input power from an input to a load connected to the output of the power converter, and it inevitably consumes a portion of the input power. If heat dissipation is not well designed, the power converter increases in temperature in the long run, possibly causing fire. OTP shuts down the power conversion of a power converter if the temperature of the power converter is over high.

Output terminals of a power converter short to each other when a conductive tool, for example, contacts them at the same time, resulting in the power converter over loaded. Protection against overloads can prevent a power converter from damage to the power converter itself.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

The following specification teaches a power converter with a flyback topology as an embodiment of the invention, but the invention is not limited to however. The invention could be embodied by any kinds of switching mode power supplies, such as bulk converters and boosters. It is to be understood that the disclosure and the teaching herein is not intended to limit the scope of the invention.

Figure 1:
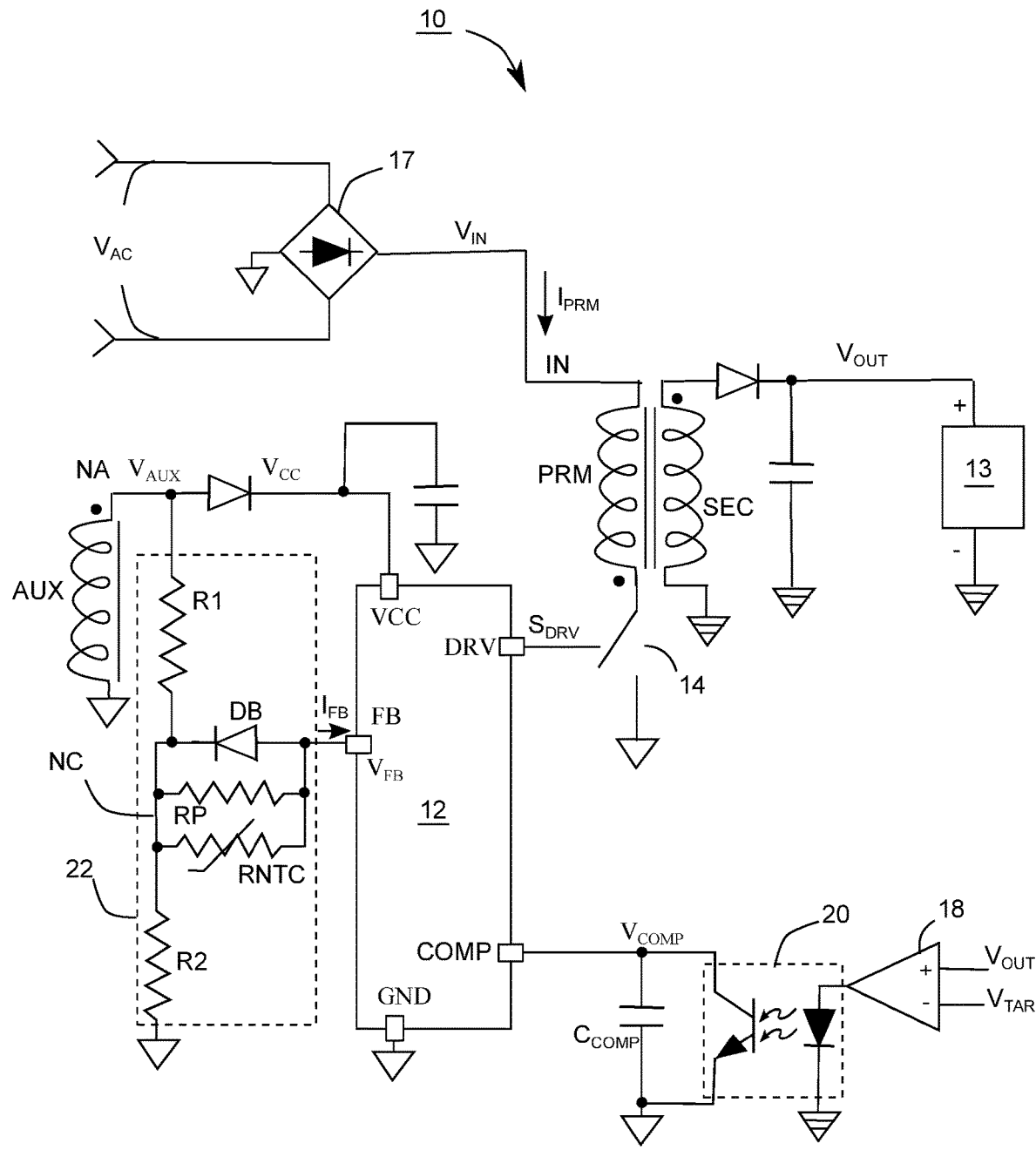
FIG. 1 demonstrates power converter 10 according to embodiments of the invention.

FIG. 1 demonstrates power converter 10 according to embodiments of the invention. Power converter 10 has a flyback topology, and could be used in a USB charger. Converting input voltage $V_{IN}$, power converter 10 provides output voltage $V_{OUT}$, a power source that powers load 13. Power converter 10 is configured to provide, among others, OVP, brownout protection, and OTP. Power converter 10 is also a quasi-resonant (QR) power converter, which is capable of performing valley switching when operating in the discontinuous conduction mode (DCM).

Bridge rectifier 17 rectifies AC voltage $V_{AC}$ to provide DC input voltage $V_{IN}$ and input ground. A transformer has primary winding PRM, secondary winding SEC and auxiliary winding AUX inductively coupled to each other. Primary winding PRM and power switch 14 are connected in series between input voltage $V_{IN}$ and input ground. One of the two ends of auxiliary winding AUX is connected to input ground, and the other provides winding voltage $V_{AUX}$.

PWM (pulse-width-modulation) signal $S_{DRV}$, generated by and provided from power controller 12, controls power switch 14 to conduct or interrupt winding current $I_{PRM}$ that flows through primary winding PRM. Due to the switching of power switch 14, secondary winding SEC is inductively induced to generate AC voltage across its two ends while a rectifier in the secondary side rectifies and low passes that AC voltage to generate output voltage $V_{OUT}$. Error amplifier 18 drives photo coupler 20 in accordance with the difference between output voltage $V_{OUT}$ and target voltage $V_{TAR}$, so as to control compensation voltage $V_{COMP}$ on compensation capacitor $C_{COMP}$ in the primary side. Compensation voltage $V_{COMP}$ determines the duty cycle and/or the switching frequency of PWM signal $S_{DRV}$, so a negative feedback loop is constructed to regulate output voltage $V_{OUT}$ at target voltage $V_{TAR}$.

Rectification of winding voltage $V_{AUX}$ generates operating voltage $V_{CC}$, providing the power required by power controller 12.

Multi-purpose circuit 22 is between node NA and input ground, and connects to feedback node FB of power controller 12. Feedback node FB is a multi-function pin if power controller 12 is in form of an integrated circuit packaged with pins for external interconnection. Via the help of multi-purpose circuit 22 and feedback node FB, power controller 12 is capable of providing 1) OTP; 2) OVP; 3) valley detection; and 4) brownout protection.

Multi-purpose circuit 22 has resistors R1, R2 and RP, thermistor RNTC, and diode DB. Resistors R1 and R2 are connected in series via connection node NC, and they are between node NA and input ground. Resistor RP, thermistor RNTC and diode DB all connect in parallel between connection node NC and feedback node FB. Diode DB functions as a rectifier. The resistance of thermistor RNTC decreases when its temperature increases.

Figure 2:
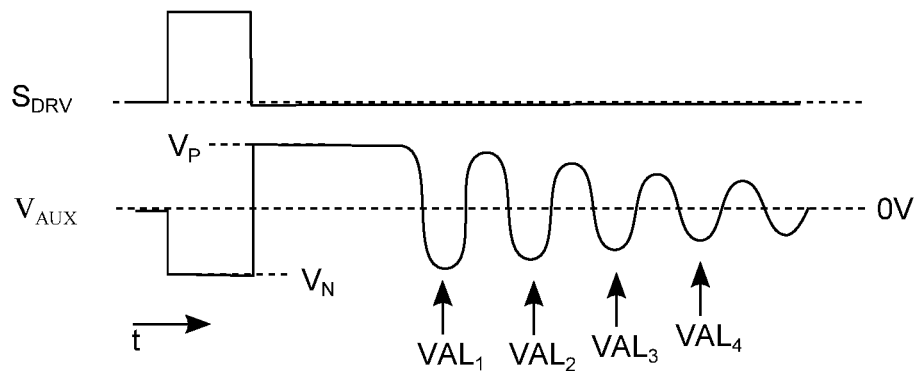
FIG. 2 demonstrates the waveform of winding voltage $V_{AUX}$ when PWM signal $S_{DRV}$ provides only one pulse.

FIG. 2 demonstrates the waveform of winding voltage $V_{AUX}$ when PWM signal $S_{DRV}$ provides only one pulse. Power switch 14 turns ON when PWM signal $S_{DRV}$ is changed from "0" to "1" in logic, so winding voltage $V_{AUX}$ is induced to have a negative voltage $V_N$ and the primary winding PRM starts energizing. The negative voltage $V_N$ reflects the magnitude of input voltage $V_{IN}$. Upon the change of PWM signal $S_{DRV}$ from "1" to "0" in logic, secondary winding SEC starts releasing magnetic energy stored by the transformer, and winding voltage $V_{AUX}$ becomes a positive voltage diode $V_P$, which inductively reflects the magnitude of output voltage $V_{OUT}$. Once the magnetic energy stored by the transformer is depleted completely, winding voltage $V_{AUX}$ oscillates around 0V, and its oscillation magnitude decreases over time as shown in FIG. 2. The oscillation of winding voltage $V_{AUX}$ generates several signal valleys $VAL_1$, $VAL_2$, $VAL_3$, and $VAL_4$, as demonstrated in FIG. 2, where a signal valley is a local minimum in view of the waveform of winding voltage $V_{AUX}$.

Figure 3:
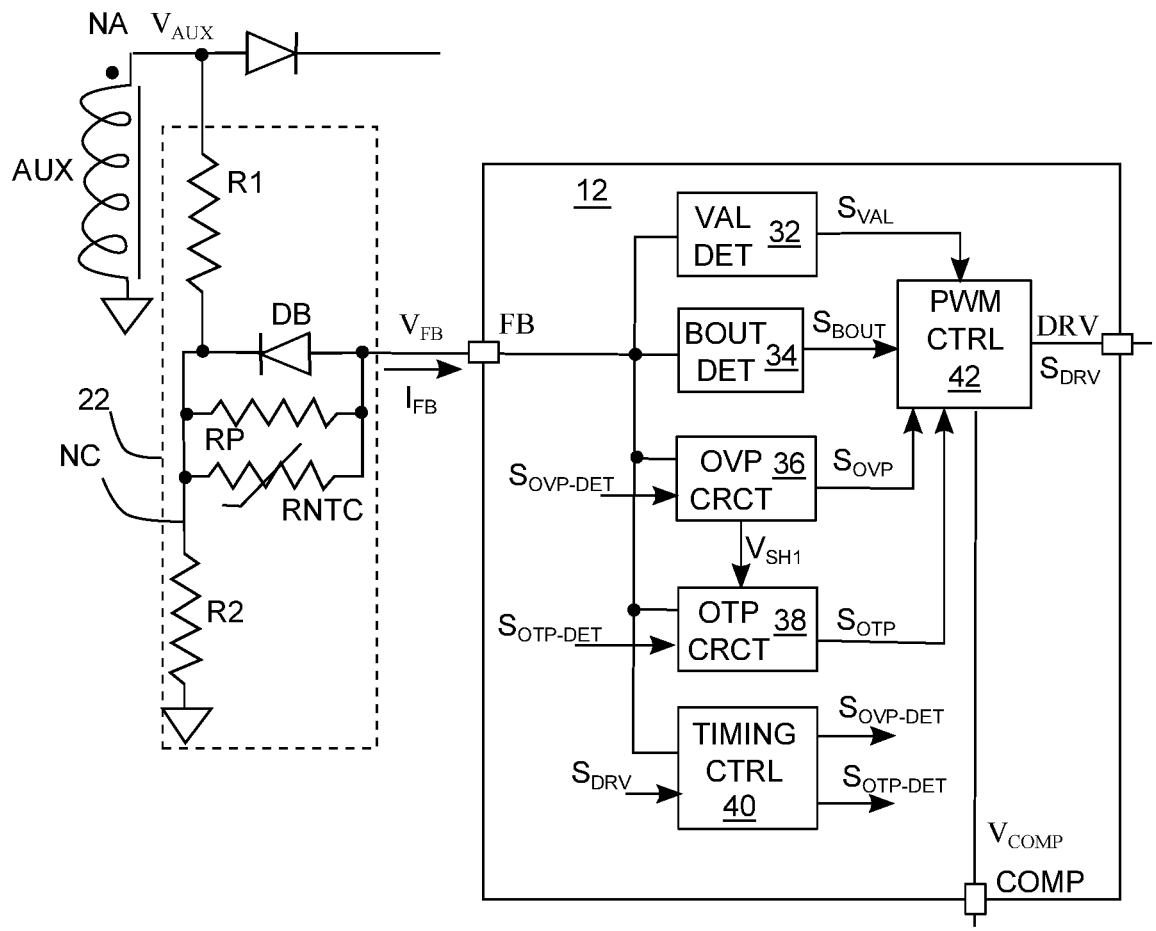
FIG. 3 demonstrates power controller 12 and multi-purpose circuit 22.

FIG. 3 demonstrates power controller 12 and multi-purpose circuit 22. Power controller 12 has valley detector 32, brownout detector 34, OVP circuit 36, OTP circuit 38, timing controller 40 and PWM controller 42.

Figure 4:
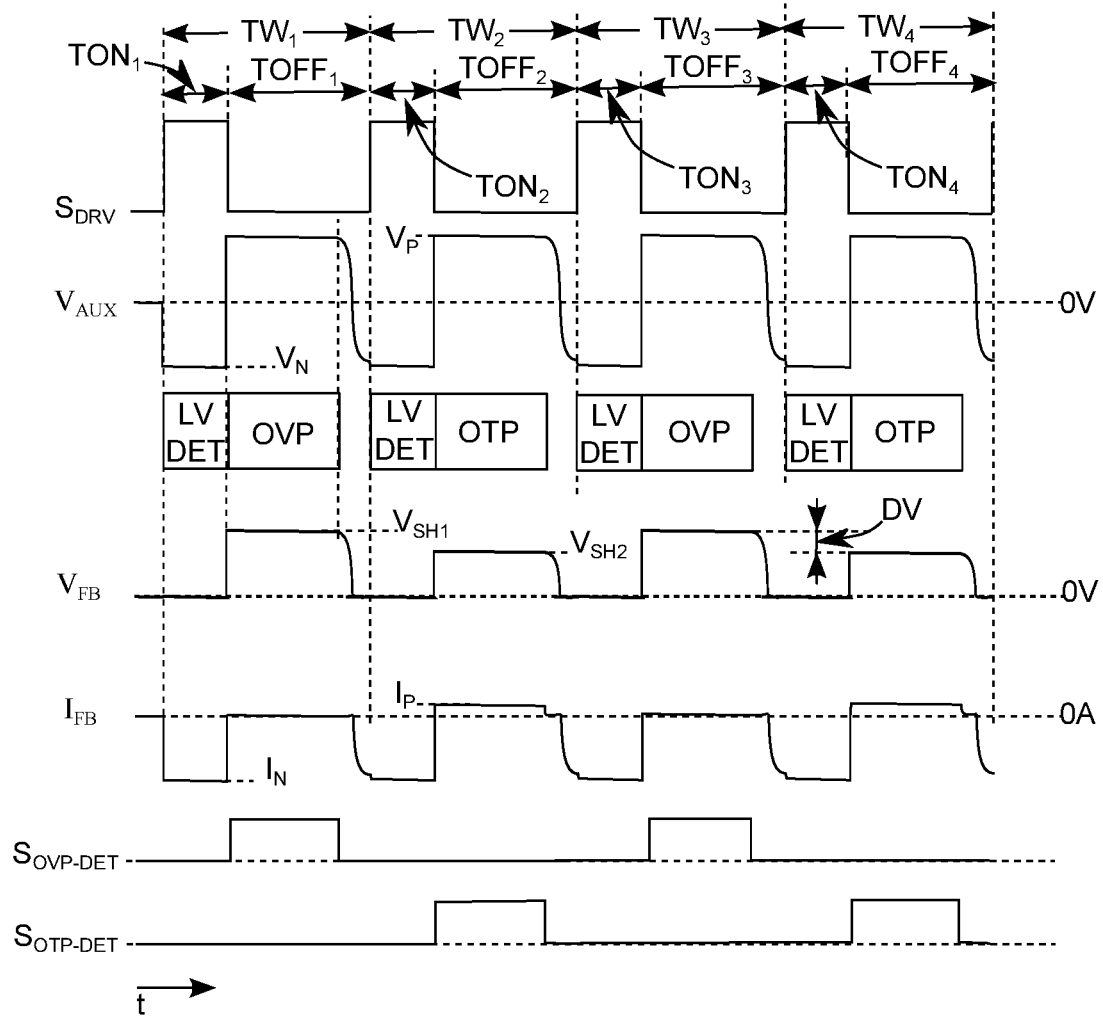
FIG. 4 shows some waveforms of signals in FIGS. 1 and 3, to explain timings in power controller 12.

FIG. 4 shows some waveforms of signals in FIGS. 1 and 3, to explain timings in power controller 12.

In accordance with compensation voltage $V_{COMP}$, PWM controller 42 generates PWM signal $S_{DRV}$, which turns ON and OFF power switch 14. As power switch 14 is periodically turned ON and OFF, switching cycles are generated and FIG. 4 demonstrates four switching cycles $TW_1$, $TW_2$, $TW_3$ and $TW_4$, each having an ON time and an OFF time to represent the periods of time when power switch 14 is ON and OFF respectively. Switching cycle $TW_1$, for example, consists of ON time $TON_1$ and OFF time $TOFF_1$.

FIG. 4 demonstrates the waveform of winding voltage $V_{AUX}$. Power switch 14 is being turned ON by PWM signal $S_{DRV}$ to start the next switching cycle about the time when first signal valley $VAL_1$ appears. In other words, power controller 12 can achieve valley switching, performing QR control.

FIG. 4 indicates that power controller 12 performs line voltage detection during ON times $TON_1$, $TON_2$, $TON_3$ and $TON_4$, OVP detection during OFF times $TOFF_1$ and $TOFF_3$, and OTP detection during OFF times $TOFF_2$ and $TOFF_4$.

ON time $TON_1$ is selected as an example to explain how power controller 12 achieves brownout protection. As shown in FIG. 4, winding voltage $V_{AUX}$, during ON time $TON_1$, is a negative voltage $V_N$ and brownout detector 34 clamps feedback voltage $V_{FB}$ to be about 0V by providing a negative current $I_N$ flowing out of power controller 12 from feedback node FB. The magnitude of negative current $I_N$ can represent input voltage $V_{IN}$, and is sensed by the brownout detector 34. If the magnitude of negative current $I_N$ is less than a predetermined value, then input voltage $V_{IN}$ is deemed too low and brownout detector 34 could accordingly disable PWM controller 42, making power switch 14 constantly OFF to achieve brownout protection. In one embodiment, PWM controller 42 is disabled immediately when the magnitude of negative current $I_N$ is sensed as being less than the predetermined value. In another embodiment, however, PWM controller 42 is disabled when the magnitude of negative current $I_N$ has been sensed as being less than the predetermined value for several consecutive switching cycles.

OFF time $TOFF_1$ is selected as an example to explain how power controller 12 achieves OVP. During OFF time $TOFF_2$, timing controller 40 uses control signals $S_{OVP-DET}$ and $S_{OTP-DET}$ to enable OVP circuit 36 and disable OTP circuit 38 respectively. When OVP circuit 36 is enabled, power controller 12 makes feedback current $I_{FB}$ about 0 A. Meanwhile, feedback voltage $V_{FB}$ is voltage $V_{SH1}$, which is a share of winding voltage $V_{AUX}$ divided by resistors R1 and R2 and can be expressed by the following equation (I).

$$V_{FB} = V_{SH1} = V_{AUX} * R_{R2}/(R_{R1}+R_{R2}) \qquad (I),$$

where $R_{R1}$ and $R_{R2}$ represent the resistances of resistors R1 and R2 respectively. Winding voltage $V_{AUX}$, in the meantime, is about in proportion to output voltage $V_{OUT}$, so equation (1) can be rewritten to be the following equation (II).

$$\begin{aligned} V_{SH1} &= V_{AUX} * R_{R2}/(R_{R1}+R_{R2}) \\ &= V_{OUT} * n * R_{R2}/(R_{R1}+R_{R2}), \end{aligned} \qquad (II)$$

where n is the ratio between winding voltage $V_{AUX}$ and output voltage $V_{OUT}$. If voltage $V_{SH1}$ exceeds a predetermined OVP value, it implies output voltage $V_{OUT}$ is over high, so OVP circuit 36 could signal to disable PWM controller 42, constantly turning OFF power switch 14 and achieving OVP.

OFF time $TOFF_2$ is selected as an example to explain how power controller 12 achieves OTP. During OFF time $TOFF_2$, timing controller 40 uses control signals $S_{OVP-DET}$ and $S_{OTP-DET}$ to disable OVP circuit 36 and enable OTP circuit 38 respectively. OVP circuit 36 nevertheless records voltage $V_{SH1}$ occurring in OFF time $TOFF_1$ and provides it to OTP circuit 38. When OTP circuit 38 is enabled, power controller 12 makes feedback current $I_{FB}$ about a positive current $I_P$ and feedback voltage $V_{FB}$ voltage $V_{SH2}$. Positive current $I_P$ meanwhile does not go through diode DB, and voltage drop DV, the difference between voltages $V_{SH1}$ and $V_{SH2}$, can be calculated according to the following equation (IV).

$$\begin{aligned} DV &= V_{SH1} - V_{SH2} \\ &= I_P * ((R_{RP} // R_{RNTC}) + (R_{R1} // R_{R2}), \end{aligned} \qquad (IV)$$

where $R_{RP}$ and $R_{RNTC}$ are the resistances of resistor RP and thermistor RNTC respectively. $R_{RP}//R_{RNTC}$ represents the equivalent resistance of a parallel circuit with resistor RP and thermistor RNTC; and $R_{R1}//R_{R2}$ the equivalent resistance of a parallel circuit with resistors R1 and R2. It is evidenced from equation (IV) that, if $(V_{SH1}-V_{SH2})/I_P$ is too small, $R_{RNTC}$ must be too small, implying the temperature of thermistor RNTC is over high. Accordingly, if $(V_{SH1}-V_{SH2})/$ $I_P$ is too small, OTP circuit 38 could signal to disable PWM controller 42, constantly turning OFF power switch 14 and achieving OTP.

Valley detector 32 sense feedback voltage $V_{FB}$ to provide valley signal $S_{VAL}$ to PWM controller 42, which controls power switch 14 accordingly. Even though in FIG. 4 power switch 14 is being turned ON at the time when signal valley $VAL_1$ about appears, this invention is not limited to however. Valley detector 32 could make power switch 14 being turned ON when anyone of the signal valleys in FIG. 2 about appears, achieving valley switching.

Figure 5:
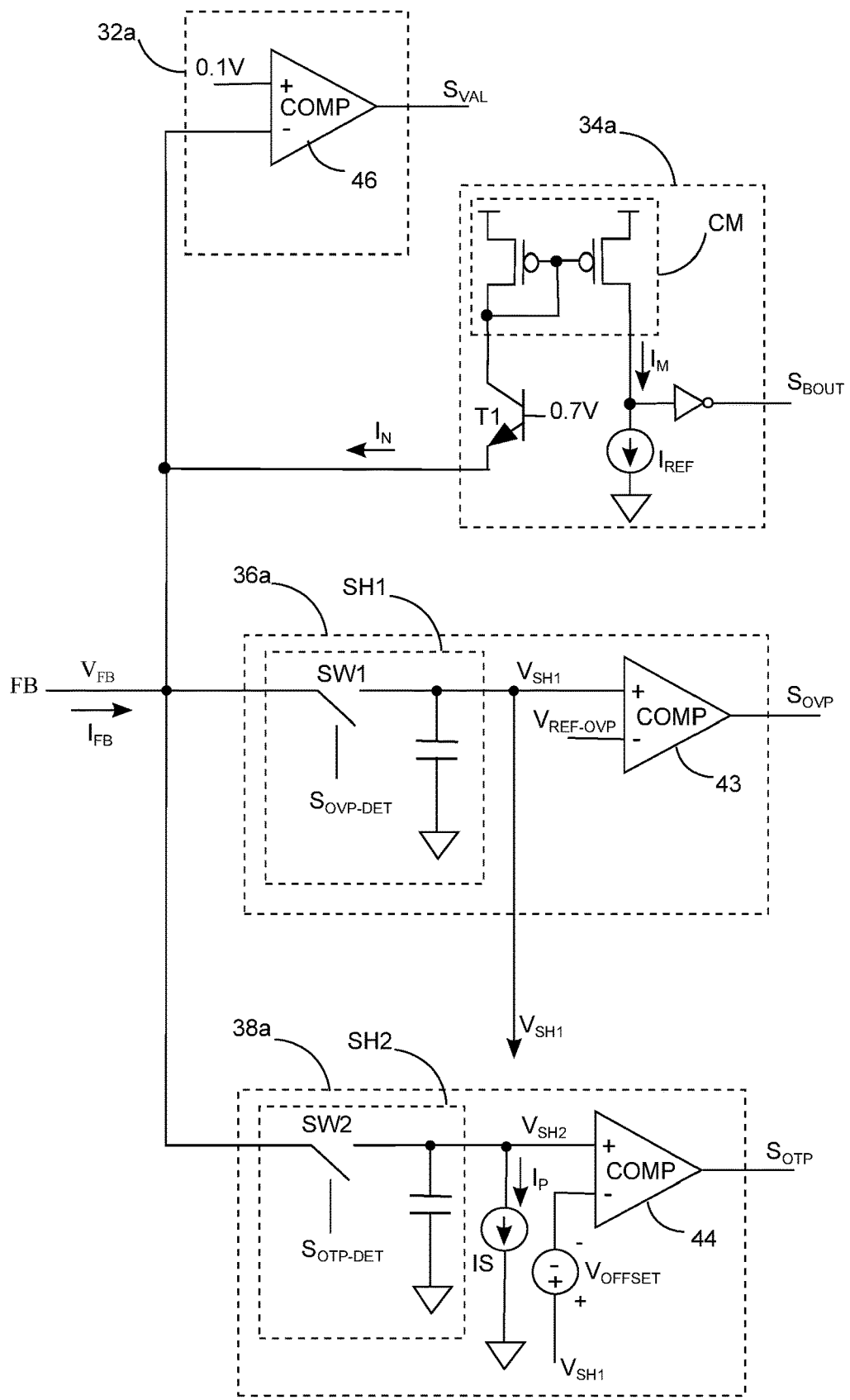
FIG. 5 exemplifies valley detector 32, brownout detector 34, OVP circuit 36, and OTP circuit 38 in FIG. 3.

FIG. 5 exemplifies valley detector 32, brownout detector 34, OVP circuit 36, and OTP circuit 38 in FIG. 3.

As winding voltage $V_{AUX}$ is a negative voltage $V_N$ during every ON time, the bipolar junction transistor (BJT) T1 in brownout detector 34a provides the negative current $I_N$ to clamp feedback voltage $V_{FB}$ at about 0V during every ON time. Current mirror CM generates current $I_M$ by mirroring negative current $I_N$. If current $I_M$ is too small, or smaller than a predetermined current $I_{REF}$, brownout signal $S_{BOUT}$ is asserted to disable PWM controller 42, constantly turning OFF power switch 14 and achieving brownout protection.

OFF time $TOFF_1$ is selected as an example to explain how OVP circuit 36a operates. OVP circuit 36a and OTP circuit 38a shown in FIG. 5 have samplers SH1 and SH2 respectively. Within OFF time $TOFF_1$, timing controller 40, sending control signals $S_{OVP\text{-}DET}$ and $S_{OTP\text{-}DET}$, turns ON switch SW1 in OVP circuit 36a, and turns OFF switch SW2 in OTP circuit 38a. Meanwhile, as power controller 12 has no current source or voltage source driving feedback node FB, feedback current $I_{FB}$ is about 0 A. Sampler SH1 samples feedback voltage $V_{FB}$ and holds it as voltage $V_{SH1}$. Comparator 43 compares voltage $V_{SH1}$ with a predetermined reference voltage $V_{REF\text{-}OVP}$, and if the former is bigger than the latter OVP signal $S_{OVP}$ is asserted to disable PWM controller 42 and to constantly turn OFF power switch 14, performing OVP.

OFF time $TOFF_2$ is selected as an example to explain how OTP circuit 38a operates. Within OFF time $TOFF_2$, timing controller 40, sending control signals $S_{OVP\text{-}DET}$ and $S_{OTP\text{-}DET}$, turns OFF switch SW1 in OVP circuit 36a, and turns ON switch SW2 in OTP circuit 38a. Meanwhile, as power controller 12 has only current source IS driving feedback node FB, feedback current $I_{FB}$ is a positive current $I_P$ equal to the current drained by current source IS. Sampler SH2 samples feedback voltage $V_{FB}$ and holds it as voltage $V_{SH2}$. Comparator 44 compares voltage $V_{SH1}$ recorded by sampler SH1 with voltage $V_{SH2}$. When voltage drop DV, the difference between voltages $V_{SH1}$ and $V_{SH2}$, is less than predetermined reference voltage $V_{OFFSET}$, OTP signal $S_{OTP}$ is asserted to disable PWM controller 42 and to constantly turn OFF power switch 14, performing OTP.

Valley detector 32a includes comparator 46, which asserts valley signal $S_{VAL}$ every time when winding voltage $V_{AUX}$ is less than 0.1V, indicating the beginning of a signal valley. Power switch 14 could be turned ON, for example, after valley signal $S_{VAL}$ is asserted and after a delay time has lapsed, to perform valley switching.

Figure 6:
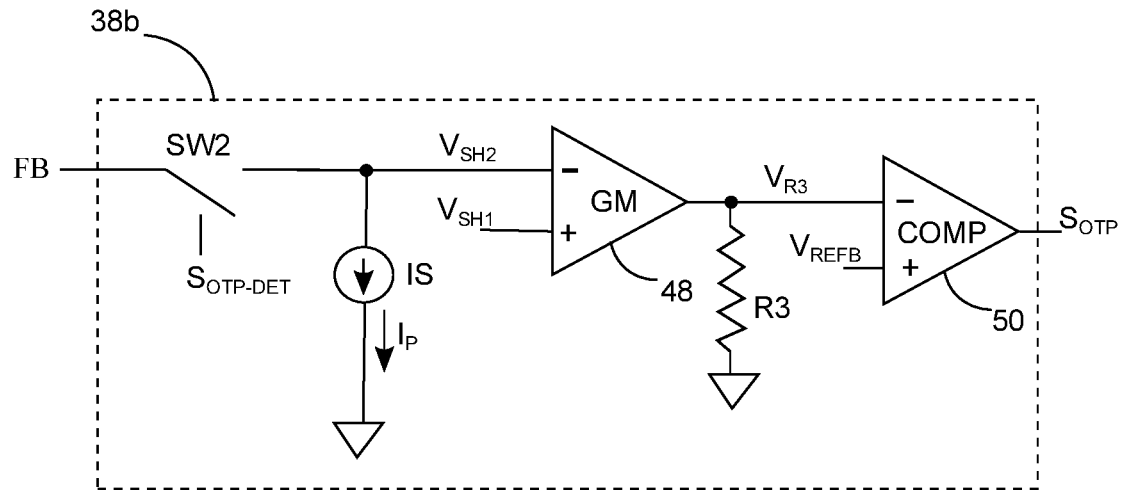
FIG. 6-8 demonstrates three OTP circuits.

FIG. 5 only exemplifies circuits inside power controller 12, and is not intended to limit the invention. FIG. 6 demonstrates another OTP circuit 38b, an example of OTP circuit 38 in FIG. 3. When control signal $S_{OTP\text{-}DET}$ turns ON switch SW2 constant current source IS makes feedback current $I_{FB}$ a positive current $I_P$. Transconductor 48 converts voltage drop DV, the difference between voltages $V_{SH1}$ and $V_{SH2}$, into a comparative current flowing through resistor R3, so voltage $V_{R3}$ across resistor R3 is in proportion to voltage drop DV. If voltage $V_{R3}$ is less than a predetermined reference voltage $V_{REFB}$, comparator 50 asserts OTP signal $S_{OTP}$ to disable PWM controller 42 and to constantly turn OFF power switch 14, performing OTP.

Figure 7:
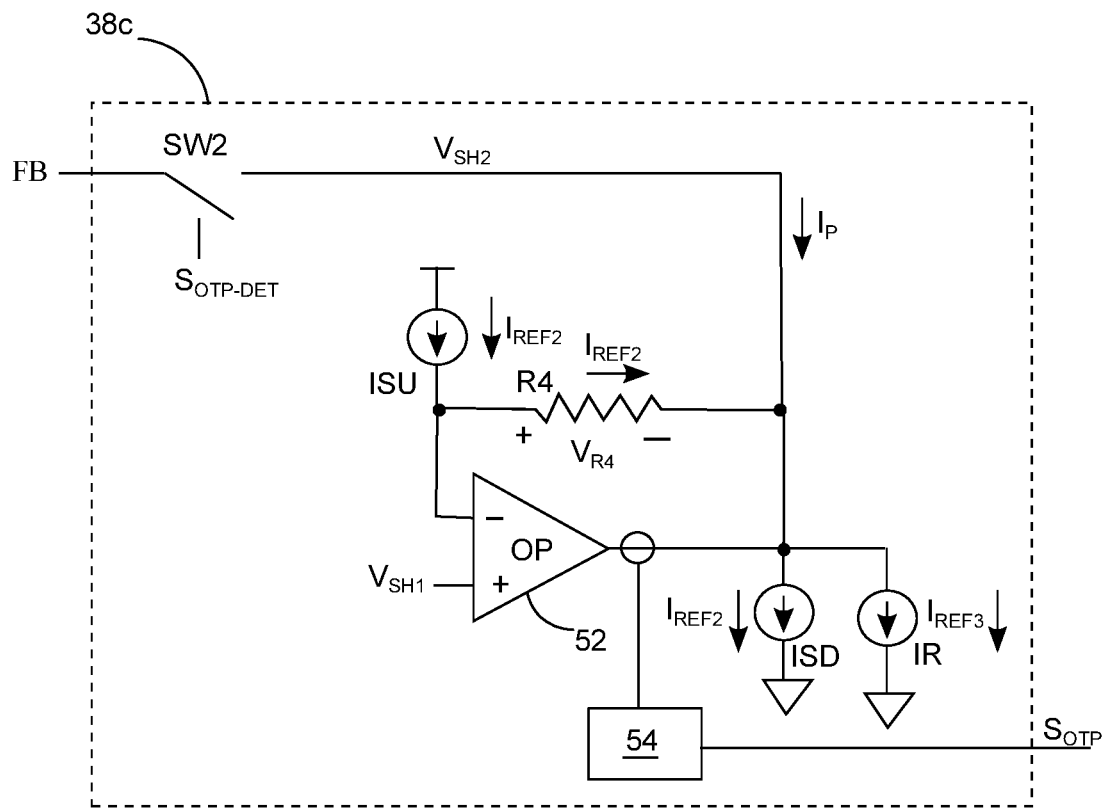

Constant current source IS is employed in FIGS. 5 and 6 to make feedback current $I_{FB}$ a positive current $I_P$, but the invention is not limited to however. FIG. 7 demonstrates another OTP circuit 38c, an example of OTP circuit 38 in FIG. 3. Operational amplifier 52, constant current sources ISU and ISD, and resistor R4 are configured to clamp feedback voltage $V_{FB}$ at voltage $V_{SH2}$ when switch SW2 is turned ON, while voltage $V_{SH2}$ is set to be voltage $V_{R4}$, the voltage across resistor R4, less than voltage $V_{SH1}$. In other words, voltage drop DV is preset to be voltage $V_{R4}$. Constant current sources ISU and ISD provide currents with the same magnitude $I_{REF2}$. Output current detector 54 senses whether operational amplifier 52 sources or sinks current. If positive current $I_P$ exceeds predetermined reference current $I_{REF3}$, operational amplifier 52 sinks current and output current detector 54 asserts OTP signal $S_{OTP}$, achieving OTP. If positive current $I_P$ is less than predetermined reference current $I_{REF3}$, operational amplifier 52 sources current and output current detector 54 de-asserts OTP signal $S_{OTP}$, so PWM controller 42 continues generating PWM signal $S_{DRV}$ to switch power switch 14.

Figure 8:
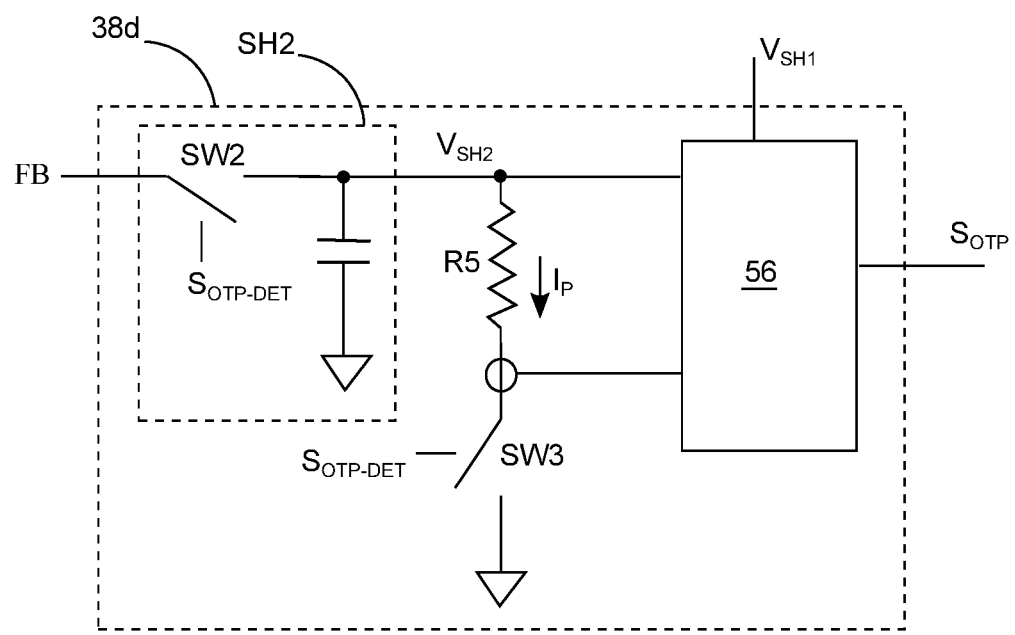

Generally speaking, OTP circuits 38a and 38b each use constant current source IS to preset feedback current $I_{FB}$, and OTP circuit 38c uses a voltage source in form of the combination of operational amplifier 52 and some interconnected circuits to preset feedback voltage $V_{FB}$, but the invention is not limited to however. FIG. 8 demonstrates another OTP circuit 38d, an example of OTP circuit 38 in FIG. 3. When control signal $S_{OTP\text{-}DET}$ turns ON switches SW2 and SW3, resistor R5 is connected between feedback node FB and input ground, making feedback voltage $V_{FB}$ voltage $V_{SH2}$ and feedback current $I_{FB}$ a positive current $I_P$. OTP circuit 38d senses the positive current $I_P$. Based on the positive current $I_P$, voltages $V_{SH1}$ and $V_{SH2}$, and equation (IV), resistance $R_{RNTC}$ of thermistor RNTC could be determined by resistance comparator 56. If resistance comparator 56 deems resistance $R_{RNTC}$ less than a predetermined value, resistance comparator 56 asserts OTP signal $S_{OTP}$ to perform OTP.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power converter for converting an input voltage into an output voltage, the power converter comprising:
 a transformer with a primary winding, a secondary winding and an auxiliary winding;
 a power switch connected in series with the primary winding between the input voltage and an input ground;
 a power controller controlling the power switch to control a winding current through the primary winding, wherein the power controller has a multi-function pin; and
 a multi-purpose circuit, comprising:
   first and second resistors, wherein a connection node makes the first and second resistors connected in series between two ends of the auxiliary winding; and a rectifier and a thermistor, connected in parallel between the multi-function pin and the connection node;

wherein the power controller is capable of performing over-voltage protection and over-temperature protection via the multi-purpose circuit and the multi-function pin.

2. The power converter as claimed in claim 1, wherein the power controller clamps a feedback voltage at the multi-function pin to be a predetermined level when the power switch is turned on, so as to detect brownout.

3. The power converter as claimed in claim 1, wherein the power controller periodically turns on and off the power switch to generate first and second switching cycles, the first switching cycle has a first ON time and a first OFF time, the second switching cycle has a second ON time and a second OFF time, the power controller, during the first OFF time, makes a feedback current flowing into the power controller through the multifunction pin 0 A, and the power controller provides the over-voltage protection in response to a feedback voltage at the multifunction pin.

4. The power converter as claimed in claim 3, wherein the feedback voltage is a first voltage during the first OFF time, the power controller, during the second OFF time, makes the feedback current substantially equal to a positive current to have a second voltage as the feedback voltage, and the power controller provides the over-temperature protection in response to the first voltage, the second voltage and the positive current.

5. The power converter as claimed in claim 4, wherein the power controller provides the over-temperature protection in response to a difference between the first voltage and the second voltage.

6. The power converter as claimed in claim 1, wherein the power controller detects a feedback voltage at the multi-function pin to perform valley switching.

7. The power converter as claimed in claim 1, wherein the power controller comprises:

a PWM controller, periodically turning ON and OFF the power switch to generate first and second switching cycles, wherein the first switching cycle has a first ON time and a first OFF time, and the second switching cycle has a second ON time and a second OFF time; and an over-voltage protection circuit and an over-temperature protection circuit, both connected to the multi-function pin;

wherein, during the first OFF time, the power controller makes a feedback current flowing into the power controller through the multifunction pin 0 A, and the over-voltage protection circuit provides the over-voltage protection in response to a feedback voltage at the multi-function pin;

during the second OFF time, the over-temperature protection circuit makes the feedback current substantially equal to a positive current to have a second voltage as the feedback voltage;

during the first OFF time, the feedback voltage is a first voltage; and the over-temperature protection circuit provides the over-temperature protection in response to the first voltage, the second voltage and the positive current.

8. The power converter as claimed in claim 7, wherein the over-temperature protection circuit provides the over-temperature protection in response to a difference between the first voltage and the second voltage.

9. The power converter as claimed in claim 7, wherein the over-temperature protection circuit comprises a constant current source to generate the positive current.

10. The power converter as claimed in claim 7, wherein the over-temperature protection circuit comprises a transconductor to convert a difference between the first voltage and the second voltage into a comparative current.

11. The power converter as claimed in claim 7, wherein the over-voltage protection circuit comprises a first sampler to hold the first voltage, and the over-temperature protection circuit comprises a second sampler to hold the second voltage.

12. The power converter as claimed in claim 7, further comprising:

a valley detector comparing the feedback voltage with a predetermined reference voltage to perform valley switching.

13. The power converter as claimed in claim 1, wherein the power controller is configured to perform steps comprising:

periodically turning ON and OFF the power switch to generate first and second switching cycles, wherein the first switching cycle has a first ON time and a first OFF time, and the second switching cycle has a second ON time and a second OFF time;

during the first OFF time, making a feedback current flowing into the power controller through the multi-function pin 0 A, and providing the over-voltage protection in response to a feedback voltage at the multi-function pin, wherein the feedback voltage has a first voltage during the first OFF time;

during the second OFF time, making the feedback current a positive current flowing into the power controller through the multifunction pin, and making the feedback voltage a second voltage; and providing the over-temperature protection in response to the first voltage, the second voltage and the positive current.

14. The power converter as claimed in claim 13, wherein the steps comprise:

providing the over-temperature protection in response to a difference between the first voltage and the second voltage.

15. The power converter as claimed in claim 13, wherein the steps comprise:

performing valley switching in response to the feedback voltage.

16. The power converter as claimed in claim 13, wherein the steps comprise:

clamping, during the first ON time, the feedback voltage to be a predetermined level to detect brownout.

17. The power converter as claimed in claim 13, wherein the steps comprise:

clamping, during the second OFF time, the feedback voltage to be the second voltage and detecting the positive current.

* * * * *